United States Patent [19]

Patti et al.

[11] Patent Number: 5,052,758

[45] Date of Patent: Oct. 1, 1991

[54] WASHER MECHANISM FOR A WHEEL COVER

[76] Inventors: Tony Patti, 1001 Carden St., San Leandro, Calif. 94577; David J. Fitzgerald, 16571 Los Banos, San Leandro, Calif. 94578

[21] Appl. No.: 437,124

[22] Filed: Nov. 16, 1989

Related U.S. Application Data

[63] Continuation-in-part of Ser. No. 364,128, Jun. 12, 1989, Pat. No. 4,950,036.

[51] Int. Cl.⁵ .............................................. B60B 7/14
[52] U.S. Cl. .............................. 301/108 S; 301/37 S; 411/113; 411/533; 411/536
[58] Field of Search ............... 301/37 R, 37 S, 108 R, 301/108 S; 411/108, 112, 113, 533, 535, 536, 173, 177, 183, 103, 161, 162, 160

[56] References Cited

U.S. PATENT DOCUMENTS

| | | | |
|---|---|---|---|
| 2,037,470 | 4/1936 | Hunt | 301/37 S |
| 2,133,454 | 10/1938 | Hunt | 310/37 S |
| 3,314,465 | 4/1967 | Bien | 411/112 |
| 3,356,421 | 12/1967 | Trevarron, Jr. | 301/37 S |
| 4,212,224 | 7/1980 | Bragg, Jr. et al. | 411/113 X |
| 4,240,670 | 12/1980 | Zorn et al. | 301/108 S X |

FOREIGN PATENT DOCUMENTS 250011  9/1926  Italy .................................. 301/108 S

*Primary Examiner*—Russell D. Stormer

[57] ABSTRACT

A wheel cover for a vehicle utilizing a mounting member including a first surface and opposite second surface. The mounting member also includes a multiplicity of opening of two types. The first type of openings fits over an existing lug bolt and nut of the vehicle wheel, while the second type of smaller opening merely fits over the lug bolt. Thus, removal of only certain nuts is required to hold the mounting member to a vehicle wheel. A multiplicity of resilient projections at least partially surround the second group of openings. The resilient projections permit the normal seating of a lug nut with a lug bolt while employing the ramped portion of the lug nut to hold the mounting member and other wheel accessories to the vehicle wheel.

8 Claims, 2 Drawing Sheets

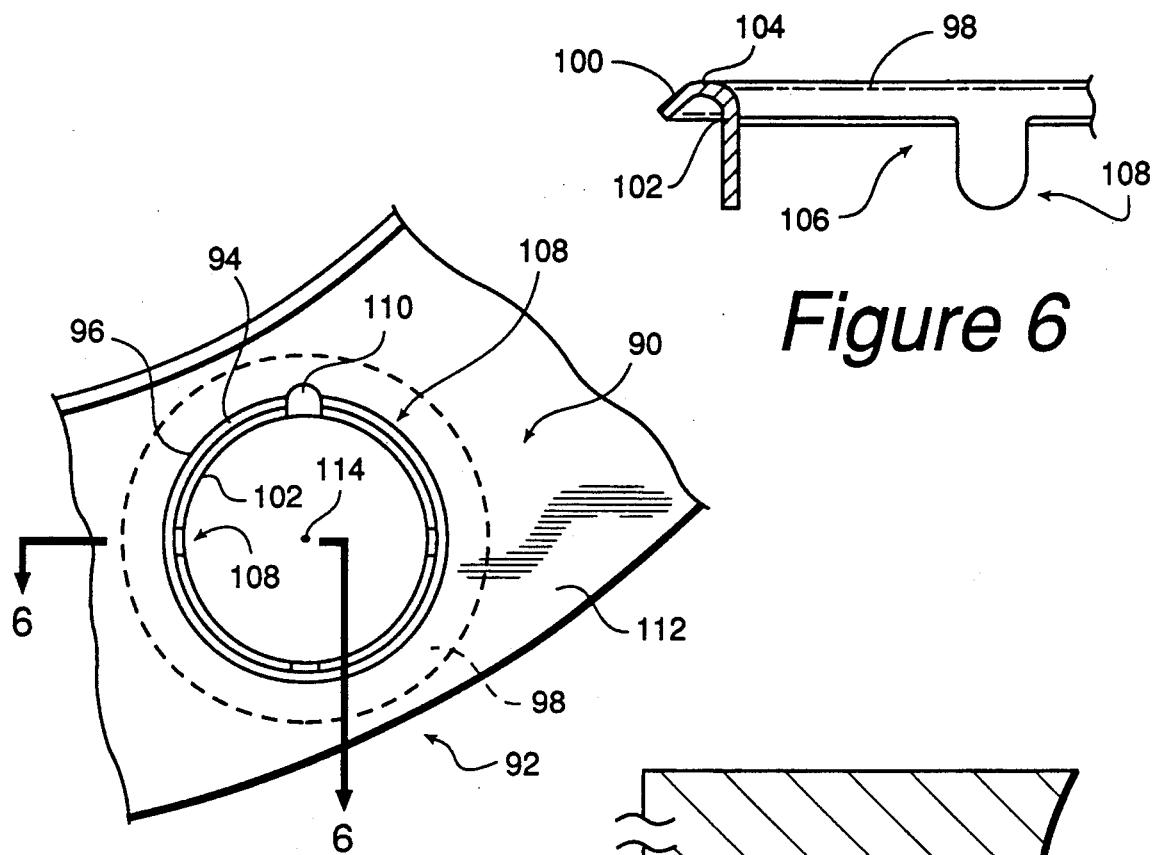
Figure 6
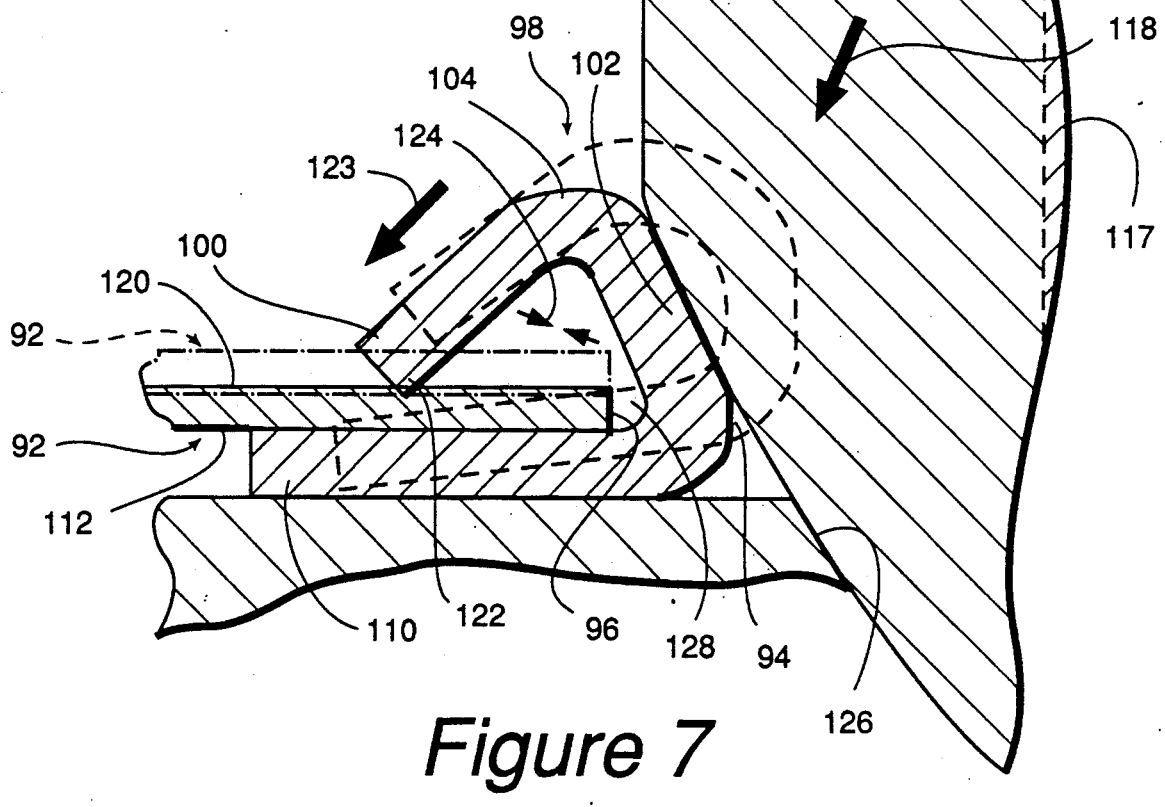
Figure 5
Figure 7

WASHER MECHANISM FOR A WHEEL COVER

CROSS-REFERENCES TO RELATED APPLICATIONS

The present application is a continuation-in-part of U.S. Pat. application Ser. No. 07/364,128 filed June 12, 1989, now U.S. Pat. No. 4,950,036.

BACKGROUND OF THE INVENTION

The present invention relates to a novel wheel cover for a vehicle. Wheel cover systems are widely used on vehicles to create an esthetic appearance of a vehicle wheel. Wheel covers are subjected to intense stress of rather long duration during normal operation of the vehicle which can cause a vehicle wheel cover to separate from a vehicle wheel. Often, the vehicle wheel cover is lost or causes damage and, possibly, injury to bystanders when separated from the wheel. Replacement of a lost wheel cover can be very expensive.

Reference is made to U.S. Pat. No. 4,240,670 which provides for a novel wheel cover which requires only the removal of every other lug nut on a particular wheel. Thus, installation of the vehicle cover described in U.S. Pat. No. 4,240,670 does not require the jacking or raising of a vehicle. Although the wheel cover system shown therein was a great advance, the use of separate washers with a flange plate or beauty ring complicates the wheel cover system. For example, separable washers are difficult to ship and pack. Also, washers are often not installed properly since gravity tends to pull a washer surrounding a lug nut downwardly causing a eccentric fit thereupon. Further, washers are often lost or not replaced after maintenance of the wheel requiring removal of the beauty ring or other wheel cover. Missing washer enhance the possibility of losing a wheel cover.

A wheel cover which solves the problems encountered in the prior art would be a great advance in the transportation field.

SUMMARY OF THE INVENTION

In accordance with the present invention a novel and useful wheel cover for a vehicle is provided.

The wheel cover of the present invention utilizes a mounting member which possesses a first and an opposite second surface. The mounting member may be in the form of a beauty ring, wheel simulator, axle cover, and the like. The mounting member includes a multiplicity of openings which pass through the same from the first surface to the second surface thereof. The openings may be described as falling into a first group which pass over and fit around certain of the lug bolts and associated lug nuts. A second group of smaller openings pass over and fit around only the lug bolts of the vehicle wheel. Thus, the vehicle nut must be removed to accommodate the second group of openings. The first surface of the mounting member would lie adjacent the vehicle wheel outer surface when the particular nuts are removed.

The invention is also constructed with a multiplicity of resilient projections which at least partially surround the second group of openings of the mounting member. The multiplicity of projections are formed integrally with the mounting member. Each projection includes a first and a second portion which extends toward the vehicle wheel. An intermediate portion connects the first and second portions and includes a bend or crook. The first portion of the resilient projection is capable of bearing on the lug nut without interference with the seating of the nut and on the vehicle wheel.

Each resilient projection may include a lip which is connected to the second portion of each of the multiplicity of resilient projections. The lip extends outwardly from the vehicle wheel and may be used to engage another wheel accessory such as an axle cover.

Another aspect of the present invention may take the form of a washer mechanism possessing a deformable member, which may be a resilient member, having a first portion capable of lying atop the upper surface of a wheel cover. A second portion extends into an opening through the wheel cover, and a third intermediate portion connects the first and second portions. Means is provided for confining the deformable member to the vicinity of the wheel cover opening with a stop for limiting travel of the deformable member along the axis of the opening. Such means may include a bendable tab extending from the second portion of the deformable member adjacent the undersurface of the wheel cover.

It may be apparent that a novel and useful vehicle wheel cover has been described.

It is therefore an object of the present invention to provide a vehicle wheel cover which eliminates the need for separate washers or washer member to secure the vehicle wheel cover to a vehicle wheel.

It is another object of the present invention to provide a vehicle wheel cover which is rugged and relatively easy to install since it possesses a one-piece construction.

Another object of the present invention is to provide a wheel cover which is relatively simple and inexpensive to manufacture into beauty rings, wheel simulators, and other wheel accessories.

Yet another object of the present invention is to provide a wheel cover of unitary construction which will not separate from the wheel after being installed using conventional lug nuts and lug bolts.

A further object of the present invention is to provide a washer mechanism usable with a wheel cover which permits mounting of the same by eliminating hand tightening of the lug nuts.

Yet another object of the present invention is to provide a washer mechanism usable with a wheel cover which is permanently held to a wheel cover but includes easily replaceable elements.

Another object of the present invention is to provide a washer mechanism usable with a wheel cover which accommodates size tolerances of the wheel cover openings.

The invention possesses other objects and advantages especially as concerns particular characteristics and features thereof which will become apparent as the specification continues.

BRIEF DESCRIPTION OF THE DRAWINGS

FIG. 5 is a bottom plan view of an alternate embodiment of the present invention showing a washer mechanism, partially confined to a wheel cover opening.

FIG. 6 is a sectional view taken along line 6—6 of FIG.

FIG. 7 is a partial sectional view of the washer mechanism of FIG. 5 a portion of which is being torqued by a lug nut onto a wheel.

For a better understanding of the invention reference is made to the following detailed description of the preferred embodiments which should be referenced to the hereinabove described drawings.

DESCRIPTION OF THE PREFERRED EMBODIMENTS

Various aspects of the present invention will evolve from the following detailed description thereof which should be taken in conjunction with the heretofore described drawings.

Figure 1:
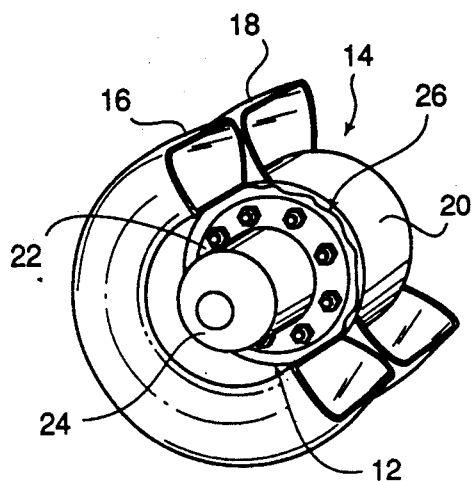
FIG. 1 is a cut-away perspective view of an embodiment of the invention in place on a typical wheel assembly having dual tires installed thereon.
Figure 2:
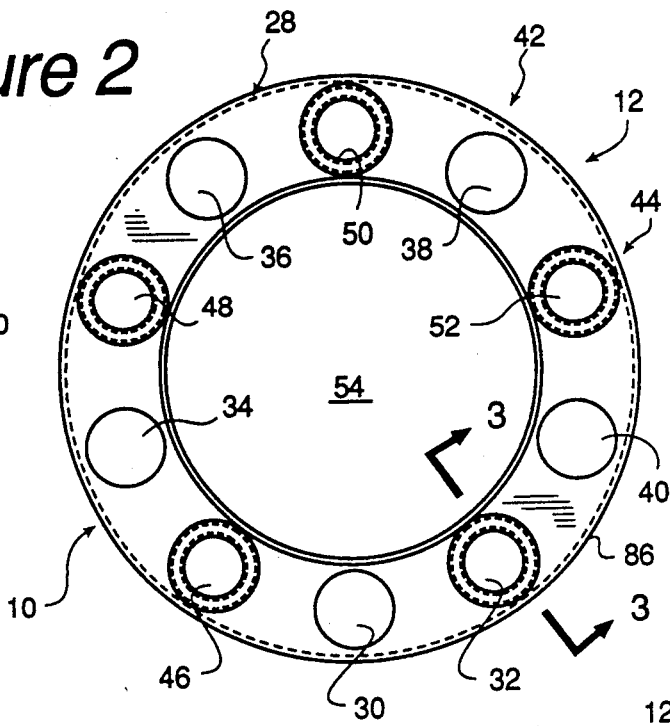
FIG. 2 is a top plan view of an embodiment of the present invention.

The invention as a whole is identified in the drawings by reference character 10. The wheel cover 10 includes as one of its elements a mounting member 12 in the form of a "beauty ring" which may be constructed of metal such as stainless steel. Mounting member 12 fits on a wheel assembly 14, FIG. 1, which includes tires 16 and 18 utilizing inner dual 20 and outer dual 22 for support. Assembly 14 also includes axle cover 24 and a plurality of lug bolts and lug nuts 26. Returning to FIG. 2, it may be observed that mounting member 12 includes a multiplicity of openings 28. Alternate openings such as opening 30 constitute one group which are intended for passing over each lug bolt and lug nut of plurality of lug bolts and lug nuts 26. On the other hand, alternate openings such as opening 32 possess a smaller diameter to only fit over the lug bolts of plurality of lug bolts and lug nuts 26. Thus, lug nuts must be removed corresponding to the positions represented by opening 32 and alternate openings about the perimeter of circular mounting member 12. In otherwords, openings 30, 34, 36, 38, and 40 form group of openings 42 which are essentially larger than group of openings 44 consisting of openings 32, 46, 48, 50, and 52. Central opening 54 is intended to encompass the axis of wheel assembly 14; such axle being covered by axle cover 24 in Fig. 1. It should be noted that mounting member 12 being formed of stainless steel exhibits a springy or resilient characteristic.

Figure 3:
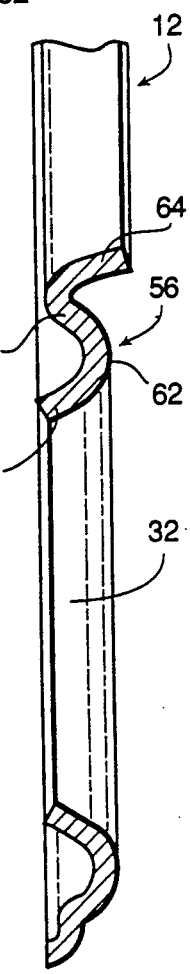
FIG. 3 is a sectional view taken along line 3—3 of FIG.

With reference to FIG. 3, it may observed that mounting member 12 includes a stamped resilient projection or protuberance 56 in the form of a circular bubble or hump which surrounds opening 32. Each opening of group of openings 44 includes such a resilient projection. Thus, the discussion concerning opening 32 also applies to the remaining openings of group of openings 44. Each projection 56 includes a first portion 58 and a second portion 60 which extend toward the vehicle wheel duals 20 and 22, FIG. 4, which will be discussed in greater detail hereinafter. Intermediate portion 62 of resilient projection 56 connects first and second portions 58 and 60. Immediate portion 62 includes a bend or crook in this regard. Resilient projection 56 also includes a lip 64 connected to second portion 60 thereof. Lip 64 extends outwardly from wheel duals 20 and 22. Lip 64 is resilient or springy as is the remainder of resilient projection 56.

Figure 4:
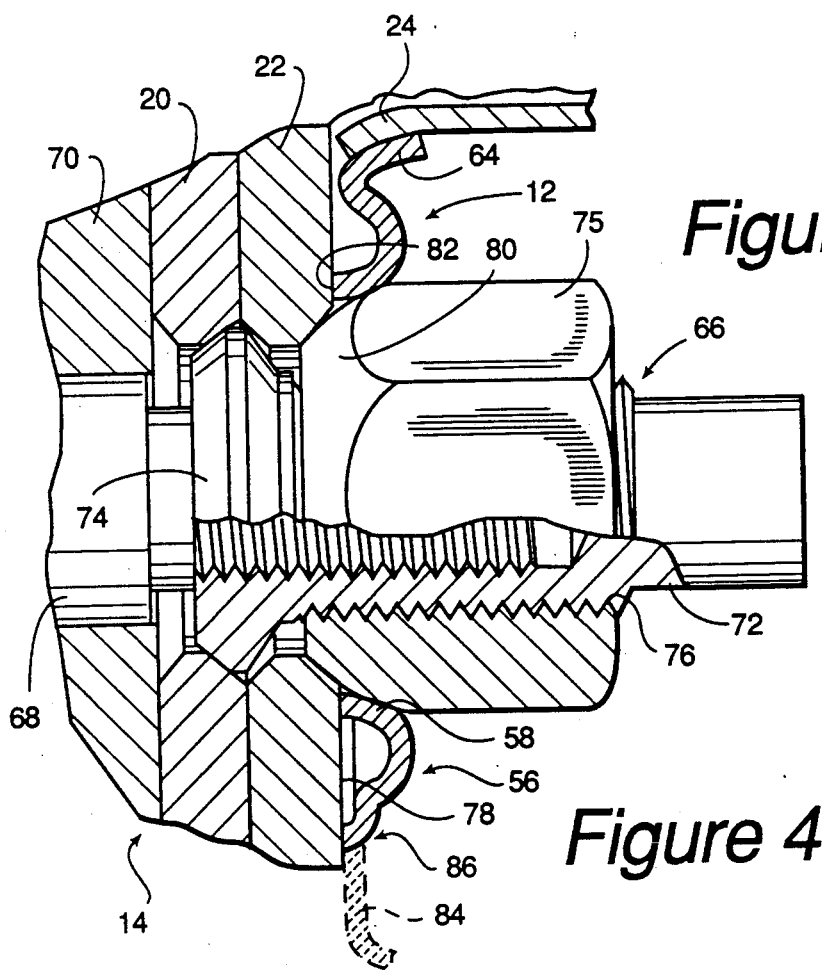
FIG. 4 is a sectional view of the present invention installed on a typical lug bolt using conventional lug nuts.

Turning to FIG. 4, it may be observed that wheel assembly 14 as illustrated in section to show a compound lug bolt and lug nut assembly 66. Lug bolt 68 extends from axle hub 70. Lug bolt 68 extend through inner and outer duals 20 and 22 and threads through the interior of lug bolt 72 which extends further from duals 20 and 22. Lug bolt assembly 66 includes a head or nut 74 which forces inner dual 20 against axle hub 70. Standard lug nut 75 threads onto threaded outer portion 76 of lug bolt 66. Outer dual 22 is held in this manner.

Turning now to FIGS. 5 and 6, another embodiment 90 of the present invention is illustrated. Washer mechanism 90 is employed with a wheel cover 92 of annular configuration, such as wheel cover 10, but having a plurality of openings such as opening 94 of uniform size through wheel cover 92. Opening 94 includes an inner edge 96 which extends around the opening 94 and defines the diameter of the same.

Washer mechanism 90 possesses a deformable member 98. Member 98 may also be resilient and constructed of resilient metallic material such as 301 stainless steel. It may be observed, that deformable member 98 includes a first portion 100 and a second portion 102. A third intermediate portion 104 connects first and second portions 100 and 102. Third intermediate portion 104 may be curved or bent as depicted in the drawings.

Means 106 is also provided for confining deformable member 98 to opening 94 through wheel cover 92. Means 106 may take the form of a plurality of tabs 108 which are bendable relative to wheel cover 92. FIG. 5 depicts a quartet of tabs 108, tab 110 being bent into position onto undersurface 112 of wheel cover 92. Means 106 confines deformable member 98 to opening 94 such that first portion 100 and plurality of tabs 108 serve as stops for the movement of washer mechanism 90 along axis 114 of opening 94, i.e. generally perpendicularly to surfaces 112 and 120 of wheel cover 92.

Turning to FIG. 7, washer mechanism 90 is shown within opening 94 being loaded (solid lines) and unloaded (phantom lines) by the action of lug nut 116 on a lug bolt 117. Directional arrow 118 indicates the force exerted by lug nut 116. First portion 100 of deformable member 98 is capable of lying on the first or outer surface 120 of wheel cover 92. Second portion 102 of deformable member 98 lies adjacent edge 96 of opening 94. As may be obvious from FIG. 7, tab 110 has been initially bent beneath wheel cover 92 (phantom rendition). The tightening of nut 116 bears most heavily on second portion 102 of washer mechanism 90. Edge 122 of first portion 100 of deformable member 98 scores top surface 120 of wheel cover 92 to serve as an anchor preventing transverse movement of first portion 100 along surface 120 of wheel cover 92. Directional arrow 123 represents the force on first portion 100 of deformable member 98 exerted by lug nut 116. Tab 110 extends further along second or undersurface 112 of wheel cover 92 during this action also (solid lines). Opposing arrows 124 illustrates the force of washer mechanism 90 on wheel cover 92 when lug nut 116 has be tightened. Again, washer mechanism 90 provides a non-interference fit between lug nut 116 and wheel surface 126.

In operation, mounting member 12 is placed against the outer face 78 of outer dual 22. Group of openings 44 having resilient projections are placed over the plurality of lug bolts, such as lug bolt 62, with plurality of nuts, such as nut 74, removed. The remaining group of openings 42 fit over plurality of lug bolts and lug nuts 26 without removal of the lug nuts. The nuts, such as nut 74, are then threaded onto the lug bolts such lug bolt 66, FIG. 4. The diameter of opening 32 is sized to prevent projection 56 from interfering with the seating of ramped portion 80 of nut 74 on outer dual 22. It should be noted that projection 56, being springy or resilient, expands outwardly from nut 74 during the seating action heretofore described. The end 82 of first portion 58 of projection 56 contacts outer surface 78 of outer dual 22 at this point. Lip 64 is forced against accessory 24 to hold the same in place. Thus, the use of separate expansion washers are eliminated by the present invention. Also, the wheel cover 10 permits the more accurate positioning of projection 56 on axle cover 24. In addition, projection 56 is not subject to shifting relative to the mounting member, as a result of centrifugal force acting on mounting member 12.

In the embodiment shown in FIGS. 5-7, washer mechanism 90 is placed within every other opening on an annular wheel cover 92 to create alternate small and large openings. The small opening is defined by the inner extension of second portion 102 of deformable member 98. Plurality of tabs 108 are bent onto undersurface 112 of wheel cover 92 to confine washer mechanism 90 to each of the openings where washer mechanism has been placed. A gap 128 exists between second portion 102 of deformable member 98 and edge 96 of wheel cover 92. Such gap 128 permits a small amount of "play" to accommodate any variations in the size of the wheel cover openings such as opening 94. The lug nuts such as lug nut 116, is then torqued onto the lug bolts such as lug bolt 117, washer mechanism of the wheel pinches wheel cover 92 into place as shown on FIG. 7. Release of the torquing pressure, directional arrow 118, would permit deformable member 98 to resume its original shape (phantom lines on FIG. 7) when deformable member 98 is resilient. However, in certain cases the deformable member may be deformed without memory, in this regard.

While in the foregoing embodiments of the invention have been set forth in considerable detail for the purpose of making a complete disclosure of the invention it may be apparent to those of ordinary skill in the art that numerous changes may be made in such details without departing from the spirit and principles of the invention.

What is claimed is:

1. A washer mechanism for a wheel cover having at least one opening therethrough with an edge between a first and a second surface, the washer mechanism comprising:
   a. a deformable member having a first portion capable of lying atop the first surface of the wheel cover, a second portion capable of lying adjacent the edge of the opening between the first and second surfaces of the wheel cover, and a third intermediate portion interconnecting said first and second portions, said first portion including an edge portion capable of frictionally engaging the first surface of the wheel cover to prevent transverse movement of said first portion of said deformable member along the first surface of the wheel cover upon application of force on said third intermediate portion of said deformable member; and
   b. means for deforming said deformable member to the vicinity of said opening including a stop for limiting movement of said deformable member along the axis of the opening.

2. The washer mechanism of claim 1 in which said means for confining said deformable member to the vicinity of the opening includes at least one tab connected to and extending from said second portion of said deformable member.

3. The washer mechanism of claim 2 in which said at least one tab is bendable to the second surface of the wheel cover.

4. The washer mechanism of claim 3 in which said at least one tab is a plurality of tabs extending from and spaced about the perimeter of said deformable member.

5. The washer mechanism of claim 4 in which each of said plurality of tabs is bendable to the second surface of the wheel cover.

6. The washer mechanism of claim 1 in which said deformable member is a resilient member.

7. The washer mechanism of claim 1 in which said third intermediate portion of said deformable member is a curved member.

8. The washer mechanism of claim 1 in which said second portion of said deformable member forms a gap relative to said edge of said opening.

* * * * *